US006678442B2

(12) United States Patent
Gall et al.

(10) Patent No.: US 6,678,442 B2
(45) Date of Patent: Jan. 13, 2004

(54) FIBER OPTIC CONNECTOR FOR A SEGMENTED FTTH OPTICAL NETWORK

(75) Inventors: Donald T. Gall, Port Aransas, TX (US); David M. Pangrac, Port Aransas, TX (US)

(73) Assignee: Pangrac and Associates Development, Inc., Port Aransas, TX (US)

( * ) Notice: Subject to any disclaimer, the term of this patent is extended or adjusted under 35 U.S.C. 154(b) by 0 days.

(21) Appl. No.: 10/128,820

(22) Filed: Apr. 24, 2002

(65) Prior Publication Data

US 2003/0202752 A1 Oct. 30, 2003

(51) Int. Cl.⁷ ............................................. G02B 6/28
(52) U.S. Cl. ........................................ 385/24; 385/61
(58) Field of Search ............................ 385/41, 42, 44, 385/45, 46, 47, 48, 61, 53, 55, 56, 59, 76, 78, 79

(56) References Cited

U.S. PATENT DOCUMENTS

| 4,421,383 | A | * | 12/1983 | Carlsen ........................ 385/79 |
| 4,834,494 | A | * | 5/1989 | DeMeritt et al. .............. 385/61 |
| 5,193,135 | A | * | 3/1993 | Miyagi ....................... 385/117 |
| 5,541,757 | A | * | 7/1996 | Fuse et al. .................. 359/125 |
| 5,694,234 | A | * | 12/1997 | Darcie et al. ................ 359/125 |
| 6,385,366 | B1 | * | 5/2002 | Lin ............................... 385/24 |
| 6,427,035 | B1 | * | 7/2002 | Mahony ........................ 385/15 |
| 6,522,804 | B1 | * | 2/2003 | Mahony ........................ 385/24 |
| 6,530,087 | B1 | * | 3/2003 | Kobayashi et al. .......... 725/125 |
| 6,538,781 | B1 | * | 3/2003 | Beierle et al. .............. 359/125 |

FOREIGN PATENT DOCUMENTS

WO          WO 01/74077          * 10/2001

* cited by examiner

Primary Examiner—Tulsidas Patel
(74) Attorney, Agent, or Firm—Gary R. Stanford

(57) ABSTRACT

A fiber optic connector including a body forming a fiber insertion path and an optical lens. The fiber insertion path receives an optical fiber and extends within the body to an internal end. The lens includes a first concave surface formed at the internal end of the fiber channel and a second concave surface formed on an external side of the body. The first and second concave surfaces of the lens are operative to direct light towards each other to enable optical communications between an inserted optical fiber and a connected second connector. Multiple connectors may be incorporated within the same body. A fiber tip cleaner and fiber bonding system may be included within the insertion path. An optical block incorporating the connectors may be configured as a splitter and/or combiner. The connectors and optical blocks may be used to implement a segmented FTTH optical network.

31 Claims, 8 Drawing Sheets

FIBER OPTIC CONNECTOR FOR A SEGMENTED FTTH OPTICAL NETWORK

FIELD OF THE INVENTION

The present invention relates to fiber optic networks, and more particularly to fiber optic connectors and functional blocks that enable fiber optic to the home while achieving a reliable and cost effective network.

DESCRIPTION OF RELATED ART

Fiber To The Home (FTTH) is an attractive option that has received a significant amount of attention in recent years. Significant technological advances have been made in fiber optic communications. FTTH promises to deliver "true" broadband access compared to existing access technologies including network connections based on phone lines (DSL) or coaxial cable. The hybrid-fiber-coax (HFC) architecture is a relatively recent development adopted by the cable industry in which optical signals are transported from a source of distribution (e.g., a headend) to multiple electro-optical conversion nodes via fiber optic cables. Each conversion node converts between optical signals and electrical signals using simple photo-detector technology, where the electrical signals are carried via coaxial cables routed from the conversion nodes to individual subscriber locations. Current HFC designs call for fiber nodes serving about 500 homes on the average, although the nodes could be further segmented to smaller coaxial-serving areas.

A "last mile" solution to achieve FTTH would appear to be to replace the coax cables of an HFC architecture with fiber optic cables. The traditional approach to FTTH is to route a separate optical fiber to each subscriber location. Such a solution, however, results in about 1,000 fibers on the average between each local node and the neighborhoods served (2 per house for full duplex). The average number of fibers behind each person's home in such a configuration is about 200. This has proved to be an unwieldy architecture that is difficult to establish and prohibitively expensive to maintain. FTTH has not yet proved to be cost effective to deploy and/or operate.

Experience from the coaxial cable configurations has demonstrated that cable problems can and do occur. Generally, damage to one or more cables reduces or otherwise eliminates service in corresponding downstream geographic areas. Coaxial cables are relatively inexpensive and easy to replace and/or repair. Fiber optic cables, on the other hand, are relatively expensive and difficult to repair. In proposed configurations, each cable has a multitude of optical fibers. During the installation process, the individual fibers must be identified and isolated to route each fiber to the appropriate location. Fiber optic cable repair has typically required very specialized equipment involving a sophisticated splicing operation that must be done in a relatively clean environment. The solution has been a truck loaded with very expensive fiber optic splicing equipment, referred to as a "splicing van". The general process is to clean, align and splice, which involves melting and firing the individual fibers. Although less of a problem for major thoroughfares, such as highways or rural access routes where van access is readily available, the splicing van must still be deployed to the trouble spot in the network. Even when access to the trouble spot is available, the splicing process can consume a considerable amount of time, sometimes several days. This is especially true in the last mile, where the cable is often routed in locations that are not van-accessible (such as someone's back yard).

It is desired to solve the last mile dilemma so that FTTH become a viable and economic reality.

SUMMARY OF THE PRESENT INVENTION

A fiber optic connector according to an embodiment of the present invention includes a body forming a fiber insertion path and an optical lens. The fiber insertion path is configured to receive an optical fiber and extends within the body to an internal end. The lens includes a first concave surface formed at the internal end of the fiber channel and a second concave surface formed on an external side of the body. The lens defines a centerline extending between the center points of the first and second concave surfaces. The first concave surface of the lens is operative to spread light sourced from an optical fiber inserted into the fiber channel towards the second concave surface and to re-direct light converging from the second concave surface towards the first concave surface onto the optical fiber. The second concave surface has a suitable size for visual inspection and cleaning. The second concave surface is configured to re-direct light diverging from the first concave surface to a direction generally parallel with the centerline and to re-direct light directed towards the second concave surface and in parallel with the centerline towards the first concave surface. The body may be configured to form a multiple optical fiber connector in which the body forms multiple individual fiber insertion paths and corresponding optical lenses.

The body may be made of a material that is optically transparent in an applicable wavelength range suitable for optical communications. The fiber insertion path may include a fiber guide chamber located between a fiber insert opening on an external side of the body and an opening of the fiber channel opposite the internal end. The fiber insert opening has a visible size suitable to facilitate threading an optical fiber. The fiber guide chamber is configured to guide an inserted optical fiber into the fiber channel. The fiber guide chamber is formed within the body and may have tapered walls between the fiber insert opening and the fiber guide channel opening. The fiber insert opening may have a size that is sufficient to encompass a fiber cable sheath inserted within.

The fiber optic connector may include a fiber tip cleaner located within the fiber insertion path that cleans a tip of an optical fiber while the optical fiber is inserted. The fiber tip cleaner may include, for example, at least one sheet of a low residue paper. The fiber optic connector may include a fiber bonding system located along the fiber insertion path that is operative to hold the optical fiber to the body after insertion. In a specific configuration, the fiber bonding system includes first and second epoxy chambers, first and second epoxy barriers, and first and second epoxy hammers. The epoxy chambers are provided within the body adjacent the fiber insertion path and filled with epoxy resin and hardener polymers, respectively. The epoxy barriers are positioned between the epoxy chambers and the fiber guide chamber operative to temporarily contain the epoxy polymers within the epoxy chambers. The epoxy hammers are provided in the body between outer opposing surfaces of the body and the epoxy chambers. The epoxy hammers are configured to force the epoxy polymers to breach the epoxy barriers to release the epoxy polymers into the fiber insertion path in response to compression applied to the first and second epoxy hammers.

In an alternative embodiment, an epoxy filter insert is provided that incorporates the fiber tip cleaner and the fiber bonding system. The epoxy filter insert may be configured to mount within the fiber insertion path. The epoxy filter insert may include, for example, a casing, a pair of epoxy chambers and at least one sheet of a low residue paper. The casing has an outer surface between a front end and a back end which is configured to mount to the inner walls of the body with the back end towards an opening of the fiber insertion path. The epoxy chambers are provided within and at the front end of the casing. The epoxy chambers are separated by suitable membranes and filled with epoxy polymers. The low residue paper sheet(s) are provided within and at the backend of the casing. The epoxy filter insert is positioned to block the fiber insertion path when mounted therein so that when an optical fiber is inserted, the tip of the optical fiber breaches the epoxy chambers allowing mixture of the epoxy polymers within fiber insertion path. The tip is also cleaned while breaching the low residue paper sheets while the optical fiber is inserted. The casing may have an outer surface that is conically-shaped to interface tapered walls of a fiber guide channel.

A complementary pair of fiber optic connectors according to an embodiment of the present invention are each configured with front ends that are configured to mate with the complementary connector to form a mated configuration. In the mated configuration, the second concave surfaces of the connectors are optically coupled to face each other in a concentric formation having a common centerline. The complementary pair may comprise male and female connectors or unisex connectors and may each incorporated multiple connectors.

An optical block according to an embodiment of the present invention includes a body, at least one optical functional unit provided within the body, a plurality of optical connectors mounted along an external surface of the body and a plurality of optical fibers. Each connector includes an optical lens. Each optical fiber is routed between an internal optical functional unit and a corresponding one of the optical connectors. Each lens of each connector includes first and second concave surfaces configured in a similar manner previously described.

The optical functional unit(s) may include a directional coupler and an n-way splitter. The directional coupler includes an input and first and second outputs and the n-way splitter includes an input and "n" outputs. In this embodiment, the unit includes an internal optical fiber connected between the second output of the directional coupler and the input of the n-way splitter. The optical connectors include an input connector, a tap output connector, and n splitter output connectors. The optical fibers include an input fiber optically coupled between the tap input connector and the input of the directional coupler, a tap output fiber optically coupled between the first output of the directional coupler and the tap output connector, and n splitter output fibers each coupled between an output of the splitter and a splitter output connector.

The optical functional unit may alternatively comprise an n-way combiner with n inputs and an output and a directional coupler having first and second inputs and an output. An internal optical fiber is coupled between the output of the combiner and the second input of the directional coupler. The optical connectors an input connector, an output connector and n combiner input connectors. The optical fibers include an output fiber optically coupled between the output connector and the output of the directional coupler, an input fiber optically coupled between the input connector and the first input of the directional coupler, and n combiner input fibers each optically coupled between an input of the combiner and a corresponding combiner input connector.

A segmented FTTH (Fiber to the Home) optical network that enables optical communication between a local optical communication node and multiple subscriber locations according to an embodiment of the present invention includes at least one segmented optical fiber, multiple optical taps and multiple subscriber optical fiber links. The segmented optical fiber is optically coupled to the optical communication node and routed near each subscriber location. The optical taps are distributed along the optical fiber dividing the optical fiber into a multiple segments. Each tap includes an input connector coupled to one optical fiber segment and an output connector coupled to an adjacent optical fiber segment. Each tap includes at least one splitter output connector. Each subscriber optical fiber link is coupled between a subscriber location and a corresponding splitter output connector of the optical taps.

The segmented FTTH optical network may include multiple optical combiners distributed along the optical fiber. Each combiner includes a segment input connector coupled to an optical fiber segment, a segment output connector coupled to an adjacent optical fiber segment, and at least one subscriber input coupled to a corresponding one of the subscriber optical fiber links. The segmented optical fiber, the optical taps, the subscriber optical fiber links and the optical combiners may be configured to support bi-directional optical communications. Alternatively, separate upstream and downstream segmented optical fibers may be included. In this latter embodiment, the optical fiber links each include a downstream subscriber link and an upstream subscriber link. The optical taps are distributed along the downstream segmented optical fiber, and the optical combiners are distributed along the upstream segmented optical fiber. Each combiner includes a segment input connector coupled to one optical fiber upstream segment, a segment output connector coupled to an adjacent optical fiber upstream segment, and at least one subscriber input coupled to a corresponding one of the upstream subscriber links.

BRIEF DESCRIPTION OF THE DRAWINGS

A better understanding of the present invention can be obtained when the following detailed description of embodiments of the invention is considered in conjunction with the following drawings, in which.

DETAILED DESCRIPTION OF EMBODIMENT (S) OF THE INVENTION

Figure 1:
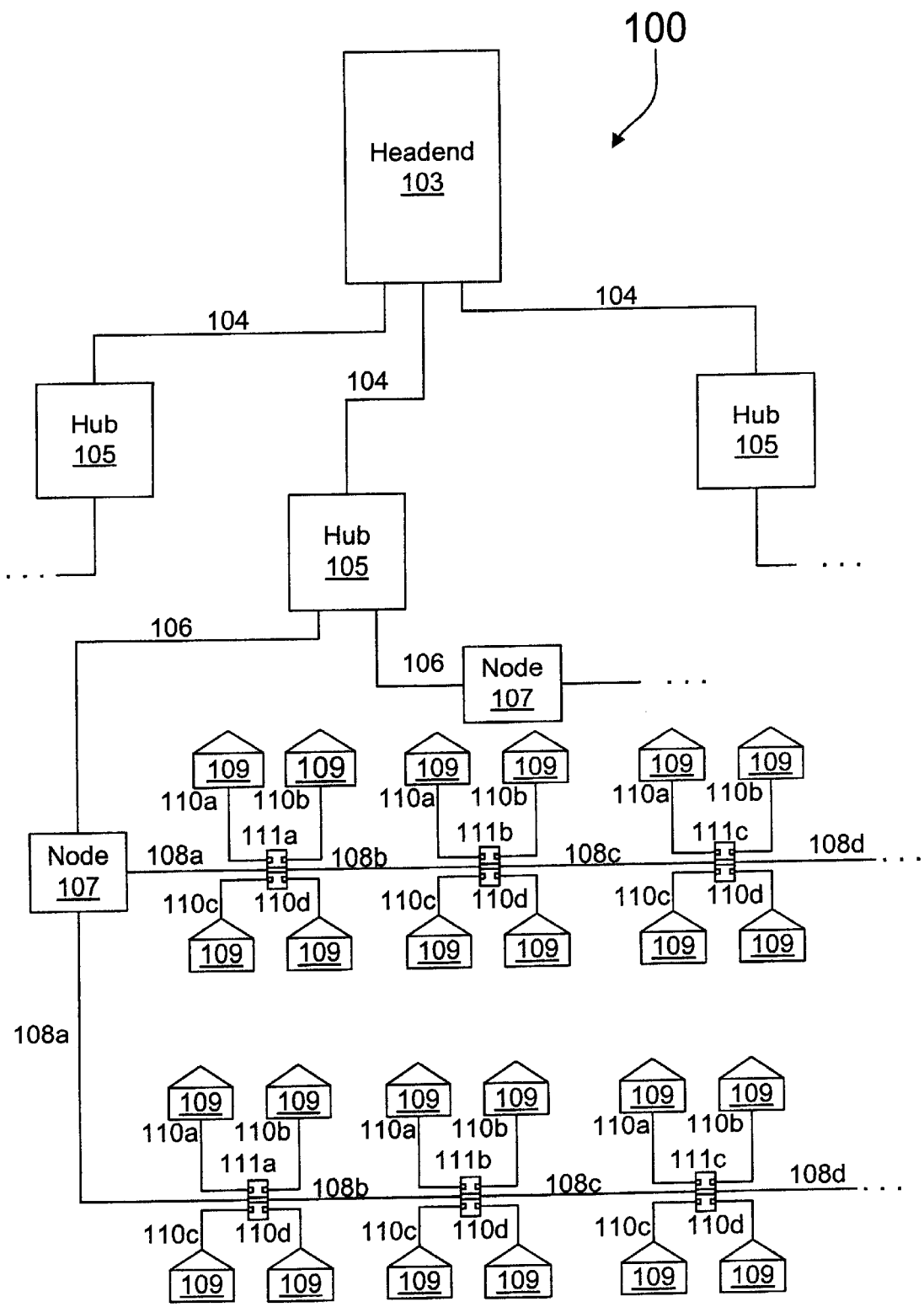
FIG. 1 is a simplified block diagram of an exemplary communication network including a fiber to the home (FTTH) configuration according to an embodiment of the present invention.

FIG. 1 is a simplified block diagram of an exemplary communication network 100 including a segmented Fiber To The Home (FTTH) configuration according to an embodiment of the present invention. One or more sources (not shown) are coupled via appropriate communication links to deliver source information to a headend 103, which distributes the source information to one or more distribution hubs 105 via respective communication links 104. Each distribution hub 105 further distributes source information to one or more nodes 107 via communication links 106, where each node 107 in turn distributes the source information to one or more subscriber locations 109 via neighborhood links 108. In the embodiment shown, bi-directional communication is supported in which upstream subscriber information from any one or more of the subscriber locations 109 is delivered to the corresponding distribution hub 105 via the corresponding links 108 and nodes 107. Depending upon the nature of the subscriber information and the network architecture, the subscriber information may be delivered to the headend 103 or to an appropriate source by the corresponding distribution hub 105.

It is noted that the headend 103, the distribution hubs 105, and the nodes 107, may generically be referred to as points of distribution for source and subscriber information. Each point of distribution supports a successively smaller geographic area. The headend 103, for example, may support a relatively large geographic area, such as an entire metropolitan area or the like. Larger geographic areas are further divided into smaller areas, each supported by a distribution hub 105. The areas supported by each distribution hub 105 are further divided into successively smaller areas, such as neighborhoods within the metropolitan area, each supported by a corresponding node 107.

Many different types of sources are contemplated, such as computer or data networks, telephony networks, satellite communication systems, off-air antenna systems (e.g. microwave tower), etc. The computer networks may include any type of local, wide area or global computer networks, both public and private, such as including the Internet or the like. The telephony networks may include the public switched telephone network (PSTN) or other public or private telephony networks. The satellite communication systems and/or the antenna systems may be employed for reception and delivery of any type of information, such as television broadcast content or the like. The headend 103 may also include video on demand (VOD) equipment (not shown). Depending upon the network architecture, any one or more of the sources may be coupled directly to one or more of the distribution hubs, in the alternative, or in addition to being coupled to the headend 103. The headend 103 includes appropriate equipment for data transmission, such as, for example, internal servers, firewalls, IP routers, signal combiners, channel re-mappers, etc.

The particular configuration of the communication network 100 upstream from the headend 103 to the nodes 107 may be designed according to any suitable configuration and is not described in detail herein. Each of the communication links 104 and 106 may be any appropriate media, such as electrical or fiber optic cables or wireless or the like, or any combination of media, such as electrical and optical media and wireless or multiple optical media, etc. The communication links 104 may comprise optical links, such as, for example, SONET (Synchronous Optical Network) links or the like. The communication links 106 also comprise optical fibers or cables that are distributed between each node 107 and a corresponding distribution hub 105. In one embodiment, the communication network 100 is configured in a similar manner as a hybrid-fiber-coax (HFC) distribution network, except that the links 108 are not coaxial cables and the nodes 107 do not convert between electrical and optical formats. Instead, the neighborhood links 108 comprise fiber optic cables that are distributed from each node 107 towards the respective subscriber locations 109.

The neighborhood links 108 could each comprise a bundle of fiber optic cables including at least one optical fiber per subscriber location 109. Thus, for a neighborhood of 100 homes, for example, the corresponding neighborhood link 108 would include at least 100 optical fibers in order to distribute at least one fiber to each subscriber location 109. If each optical fiber supports half-duplex communications (one-way), then each neighborhood link 108 would include at least 200 optical fibers including two for each subscriber location 109 for full-duplex communications. Such configurations resulted in a relatively expensive and unwieldy network to establish and maintain.

The neighborhood links 108 shown are subdivided into "x" segments 108a, 108b, 108c, etc., where each segment 108i is effectively terminated by taps 111i (individually shown as 111a, 111b, 111c, etc.) (where "i" ranges from 1 to x). For downstream communications (to the subscriber locations 109), each tap 111i incorporates a directional coupler and an n-way splitter. The directional coupler splits off a sufficient amount of the downstream optical signal for the splitter, and passes the remaining portion of the signal to the next segment 108i to traverse the neighborhood. The splitter divides the divided optical signal into n different optical signals, where each separate optical signal is asserted on a corresponding subscriber link 110 for delivery to a corresponding subscriber location 109. In the embodiment shown, each tap 111*i* includes a 4-way splitter (n=4), where each split signal is asserted on a corresponding one of subscriber links 110*a*, 110*b*, 110*c* and 110*d*. Alternative splitter configurations are contemplated depending on the neighborhood size and/or number of subscribers, such as 2-way splitters, 8-way splitters, etc.

The method used for upstream optical communications depends on the protocols and architecture employed. If each optical fiber supports bi-directional communications, then each segment 108*i* may have a single optical fiber and each tap 111*i* incorporates one or more optical combiners to deliver subscriber information upstream to a corresponding node 107. Alternatively, if each optical fiber supports half-duplex communications, then each segment 108*i* includes at least two optical fibers including a downstream fiber and an upstream fiber. An optical ribbon cable incorporating 4 separate optical fibers is contemplated in which two fibers are delivered to one neighborhood Each tap 111*i* either includes an optical combiner for upstream communications or a separate optical combiner is provided at or near each of the taps 111*i*. Many different types of optical communication protocols are possible and contemplated depending upon the particular architecture chosen, such as Time Division Multiplexing (TDM), Frequency Division Multiplexing (FDM), Wavelength Division Multiplexing (WDM), Dense WDM (DWDM), etc.

It is appreciated that the communication network 100 including the FTTH configuration shown for solving the "last-mile" problem provides many advantages over networks that attempt to distribute a separate fiber from each node 107 to each subscriber location 109. The communication network 100 distributes only one or two optical fibers to each neighborhood, where the fibers are shared by multiple subscribers. Many communication protocols for enabling such shared optical communications are known and readily available, such as TDM, FDM, WDM, DWDM, etc. Since a reduced number of optical fibers are needed, the cost of routing optical cable from each node 107 to each subscriber location 109 is substantially reduced, resulting in a significantly more cost-effective network to establish and maintain.

Furthermore, the communication network 100 employs a segmented configuration employing optical connectors, described below, that facilitate network configuration and repair. The segments and taps/combiners are not fused together but instead are coupled using the optical connectors. Each node 107 generates enough optical power on each downstream optical fiber to allow a sufficient power loss budget for a certain number of optical connections and signal divisions. The power budget is chosen to provide a sufficient power level to each subscriber location 109 supported by that node 107 given the number of splitters and connectors. Since only a limited number of subscriber locations 109 need be supported by each node 107, the power budget is sufficient to maintain communications in the last mile and to re-establish communications in an expedient, efficient and cost-effective manner. If a cable segment 108*i* is compromised (e.g., broken, damaged, destroyed, etc.), it is easily replaced or repaired, or the segment is spliced and repaired using optical connectors.

Figure 2:
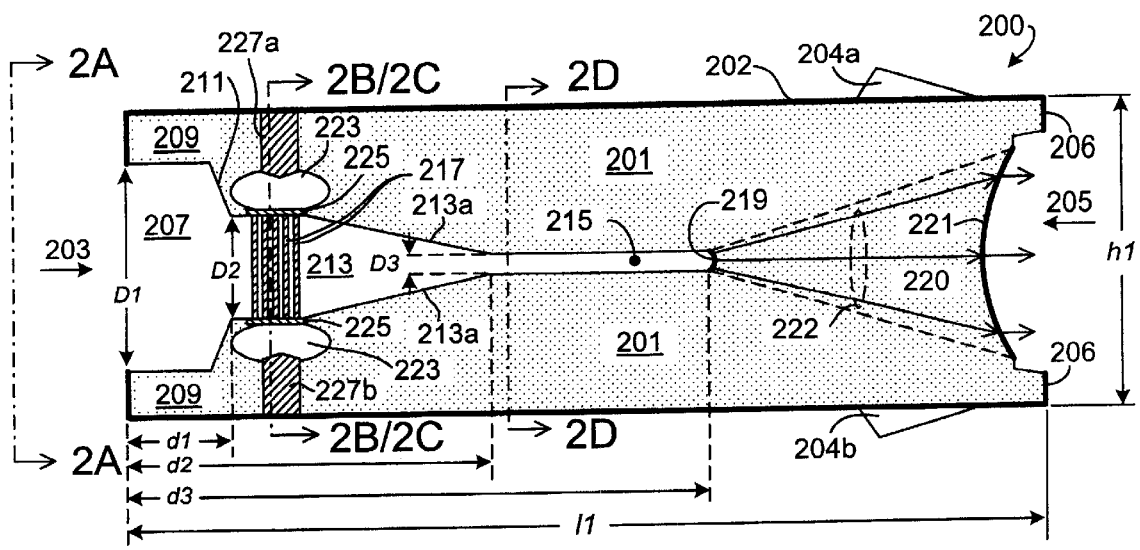
FIG. 2 is an enlarged cross-sectional side view of an exemplary male optical connector implemented according to one embodiment of the present invention.
Figure 2A:
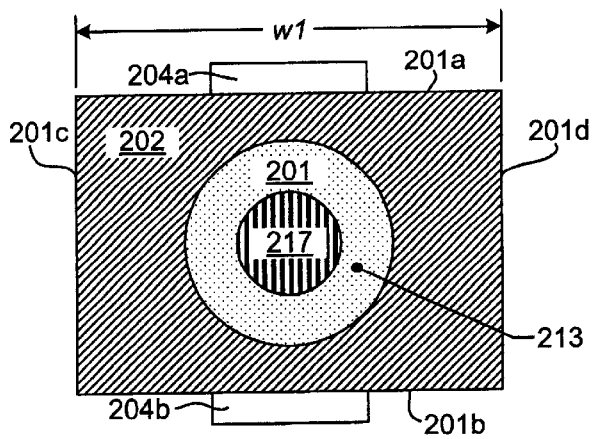
FIG. 2A is an enlarged backend view of the optical connector of FIG. 2 looking along lines 2A—2A of FIG. 2.

FIG. 2 is an enlarged cross-sectional side view of an exemplary male optical connector 200 implemented according to one embodiment of the present invention. FIG. 2A is an enlarged backend view of the optical connector 200 looking along lines 2A—2A of FIG. 2. The optical connector 200 includes a body 201 that is formed and machined or molded and polished from a single material that is optically transparent in the applicable wavelength range. The applicable wavelength range depends upon the particular wavelengths of light used for communications, such as, for example, within the range of 800–1600 nanometers (nm). The body 201 generally has a parallelepiped shape having a length "l1", a width "w1" and a height "h1" forming four rectangular faces 201*a–d* along its width, as shown in FIG. 2A, and forming a backend 203 and a front end 205. It is appreciated, however, that the overall shape of the connector 200 may assume any form factor, such as cylindrical, for example. The front end 205 includes a front face 206 for interfacing a corresponding female connector 400 (FIG. 4) as further described below. The faces include a top face 201*a*, a bottom face 201*b* and two side faces 201*c–d* as shown in FIG. 2A. An outer protective sheath 202 is optionally provided around the outer extent of the body 201. The protective sheath 202 is a suitable material that is applied onto the body 201 in any suitable manner, such as wrapping, painting, spraying, etc. The sheath 202 may optionally be made of an opaque material. The optical connector 200 illustrated is a male connector and is intended to mate with a compatible female connector 400. A suitable latching or locking mechanism 204 is mounted to the body 201 for interfacing a corresponding and complementary latching or locking mechanism on the female connector 400 to complete a connector assembly as further described below. As shown, a pair of latching or locking mechanism 204*a* and 204*b* are mounted on the top and bottom faces 201*a*, 201*b*.

A cylindrical cable insert chamber 207 having a diameter "D1" is formed at or near the center of the backend 203 of the body 201 and extends within the length of the body 201 by a depth "d1" to a base 211. The cable insert chamber 207 is configured to have a size and shape commensurate with the outer sheathing of an optical cable, so that the optical cable may fit within the cable insert chamber 207 (e.g., D1 is slightly larger than the outer sheath of a fiber optic cable). The depth d1 is selected to provide a sufficiently deep enough chamber to encompass the optical cable outer sheathing when inserted into the optical connector 200 as further described below. The height h1 and width w1 of the body 201 are each greater than the diameter D1 so that the resulting outer lip 209 formed by the chamber 207 has sufficient mechanical strength and integrity to remain intact during the connection process and when exposed to the elements in the environment in which it is expected to be located. The base 211 provides a stop for the outer sheathing of the optical cable when inserted. The base 211 is optionally tapered between the outer lip 209 and the mouth of a fiber guide chamber 213 to facilitate insertion of an optical fiber as further described below. It is noted that the cable insert chamber 207 is optional and may be omitted in other embodiments. Although not shown, a suitable fastening mechanism (e.g., screw mechanism) may be provided within the cable insert chamber 207 and mounted to the body 201 (integral or otherwise) to mechanically interface the outer sheathing of an inserted optical cable for fastening the assembly together.

The generally conical fiber guide chamber 213 is centered within (or formed concentric with) the cable insert chamber 207 beginning at the base 211 and extending within the length of the body 201 by a depth "d2" to the beginning of a central fiber channel 215. The fiber guide chamber 213 is generally conical in shape having an initial diameter of "D2"

at the base 211 and an ending diameter "D3" forming the mouth of the central fiber channel 215, and forming a tapered outer wall 213a in the body 201 at the outer extent of the fiber guide chamber 213. The diameter D2 of the opening of the fiber guide chamber 213 is sufficiently large enough to allow a gloved technician in the field to successfully view, aim and thread an optical fiber into the fiber guide chamber 213 from the backend 203 of the body 201. The diameter D3 is the diameter of the entire central fiber channel 215 and is selected to be slightly greater than the diameter of the optical fiber to enable insertion of an optical fiber. The tapered outer wall 213a of the fiber guide chamber 213 is configured to interface and guide the end of the inserted optical fiber to the central fiber channel 215 while it is being inserted. The length of the fiber guide chamber 213 (d2–d1) is generally selected to define the angular displacement of the tapered outer wall 213a to sufficiently guide without damaging the optical fiber during insertion.

The generally cylindrical central fiber channel 215 is formed concentric with the cable insert and fiber guide chambers 207, 213 beginning at the end of the fiber guide chamber 213 and extending within the length of the body 201 by a depth "d3". The diameter D3 and the depth (d3–d2) of the central fiber channel 215 are collectively selected to properly seat the optical fiber when fully inserted.

A suitable cleaning material is provided within the optical fiber insertion path (chambers 207 and/or 213) to establish a self-cleaning connector configuration. As shown, multiple cleaning sheets 217 of a low residue paper or cloth or fabric or the like is provided within the fiber guide chamber 213. The cleaning sheets 217 form a fiber tip cleaner that cleans the tip of the optical fiber as it is pushed through to penetrate each sheet during insertion. The initial portion 213b of the fiber guide chamber 213 is optionally cylindrical in shape between the base 211 and the beginning of the tapered outer wall 213a to locate the self-cleaning cleaning sheets 217, although a fully conical configuration is also contemplated.

An inner concave surface 219 is formed at the inner end of the central fiber channel 215 and an outer concave surface 221 is formed at the front end 207 of the body 201 of the optical connector 200 forming a lens 220. The surfaces 219 and 221 are concentric with each other and the outer surface 221 has a substantially greater diameter than the inner surface 219. As illustrated by exemplary light rays 222, the inner surface 219 is configured to redirect light from an inserted optical fiber towards the outer surface 221. Also, light rays directed towards the outer surface 221 (such as from a female connector) in parallel with a common centerline of the surfaces 221, 219 are converged by the outer surface 221 towards the inner surface 219 following the same optical lines but traveling in the opposite direction. Light rays sourced from an inserted optical fiber diverge to the general area of the outer surface 221, which redirects the expanded light rays in parallel with the common centerline of the surfaces 219, 221. Similarly, light rays directed in parallel with the common centerline of the surfaces 219, 221 and towards the area of the outer surface 221 converge towards the inner surface 221 and are redirected in parallel with and asserted on an optical fiber inserted within the central fiber channel 215. In this manner, the optical connector 200 supports bi-directional communications.

The diameter of the inner surface 219 is generally D3, which corresponds to the width of an optical fiber. The diameter of the outer surface 221 is significantly larger in diameter to facilitate visual inspection and cleaning by a field technician. Thus, the outer surface 221 is initially exposed to the environment during the connection process. Although the ambient environment may not be clean from a fiber optic standpoint, the outer surface 221 is sufficiently large to reduce particulate obstruction interference that might otherwise prevent fiber optic communications. In other words, a particle of dirt located on the tip of an optical fiber that is invisible to or otherwise difficult to see with the naked eye yet large enough to obstruct optical communications of an optical fiber is insignificant and inconsequential when located along the surface of the outer surface 221 given the relative diameters of the dirt particle and the outer surface 221. In one embodiment, the diameter of the outer surface 221 is approximately 10 times the diameter of the inner surface 219, so that the surface area of the outer surface 221 is at least 100 times greater than the surface area of the tip of an optical fiber. The larger diameter and area of the outer surface 221 facilitates visual inspection and cleaning by a technician in the field without the necessity of specialized and expensive optical cleaning tools.

One or more epoxy chambers 223 are provided within the body 201 near or otherwise adjacent the insertion path of an optical fiber. In the embodiment shown, the epoxy chamber(s) 223 are located on the outer perimeter of the fiber guide chamber 213. An epoxy barrier 225 is located between each epoxy chamber 223 and the fiber guide chamber 213 to temporarily seal epoxy polymers in the epoxy chambers 223 prior to use. One or more epoxy release hammers 227 are formed in the body 201 and located between the epoxy chamber(s) 223 and the outer perimeter of the body 201. In the embodiment shown, a pair of epoxy release hammers 227a and 227b are placed opposite each other, including one hammer 227a on the top face 201a and another hammer 227b on the bottom face 201b of the body 201. In this manner, as described further below, a crimping tool or the like may be used by a technician to apply clamping pressure on exposed outer faces of the epoxy release hammers 227a,b, which correspondingly apply pressure to the epoxy chambers 223 filled with epoxy polymers and to the epoxy barrier 225. The epoxy barrier 225 is configured to break or rupture with the applied pressure and release epoxy polymers from the epoxy chambers 223 into the fiber guide chamber 213. Any suitable epoxy polymers are contemplated, such as resin and hardener polymers that hardens when mixed together or otherwise exposed to ambient air.

The epoxy chambers 223, epoxy barriers 225, the epoxy release hammers 227 and the epoxy polymers collectively form a fiber bonding system suitable to bond an inserted optical fiber to the connector 200. The epoxy is selected to have sufficient bonding properties with optical fiber and with the walls 213a of the fiber guide chamber 213. The particular fiber bonding system based on epoxy is only one way of fastening the optical fiber to the connector and other bonding methods are contemplated.

Figure 2B:
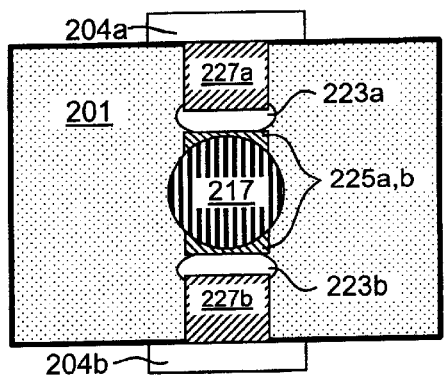
FIGS. 2B and 2C are enlarged cross-sectional backend views of the optical connector of FIG. 2 looking along lines 2B/2C—2B/2C of FIG. 2 illustrating alternative embodiments.
Figure 2C:
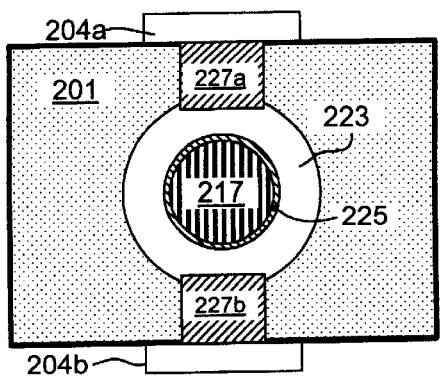

FIGS. 2B and 2C are enlarged cross-sectional backend views of the optical connector 200 looking along lines 2B/2C—2B/2C of FIG. 2. FIG. 2B illustrates a first embodiment in which two separate epoxy chambers 223a and 223b and a corresponding pair of epoxy barriers 225a and 225b are provided on opposite ends (top and bottom) of the fiber guide chamber 213. The epoxy release hammers 227a,b are shown interfacing the epoxy chambers 223a and 223b, respectively. A circular cleaning sheet 217 is illustrated filling the front portion of the fiber guide chamber 213.

FIG. 2C illustrates a second embodiment in which a single donut-shaped epoxy chamber 223 is shown surrounding the fiber guide chamber 213. A single cylindrical-shaped epoxy barrier 225 is shown positioned between the epoxy chamber 223 and the fiber guide chamber 213. For either of the embodiments shown in FIGS. 2B or 2C, the epoxy release hammers 227a,b are operated in the substantially the same manner to apply pressure to rupture the temporary epoxy barrier(s) to release epoxy into the fiber guide chamber 213.

Figure 2D:
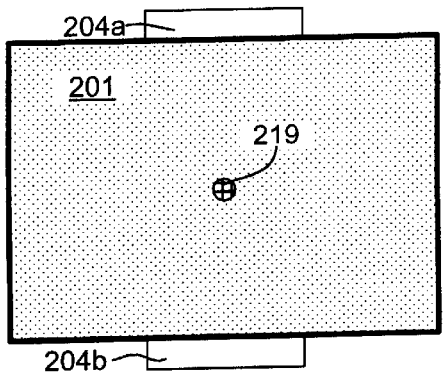
FIG. 2D is an enlarged cross-sectional backend view of the optical connector of FIG. 2 looking along lines 2D—2D of FIG. 2 illustrating the inner surface of the connector.

FIG. 2D is an enlarged cross-sectional backend view of the optical connector 200 looking along lines 2D—2D of FIG. 2. In this view, the inner surface 219 is seen looking down the central fiber channel 215 within the body 201.

Many different manufacturing techniques are contemplated for producing the optical connector 200. The body 201 including the chambers 207, 213, the central fiber channel 215, the epoxy chamber(s) 223 and cavities for the epoxy release hammers 227 may be molded or machined out of a block of connector material. A single molding process is contemplated to include any one or more or all of the chambers, channels and cavities. Alternatively, one or more machining processes are contemplated to machine any one or more or all of the chambers, channels and cavities. Any combination of molding and machining is contemplated. The surfaces 219, 221 may be molded or machined as appropriate. It is contemplated that initial forms of the surfaces 219, 221 be molded and that the surfaces be further machined or polished separately to achieve the desired optical characteristics. A fine machined polish is particularly advantageous to improve optical characteristics and reduce significant loss of signal. After the body 201 is molded or machined, the epoxy barriers 225 and cleaning sheets 217 are inserted or installed. A suitable epoxy polymer or glue is injected into each of the epoxy chamber(s) 223 and the epoxy release hammer(s) 227 are inserted or otherwise installed to seal the epoxy. The optional protective sheath 202 is applied or wrapped onto the outer surface of the body 201 of the optical connector 200 to complete the assembly.

Figure 3A:
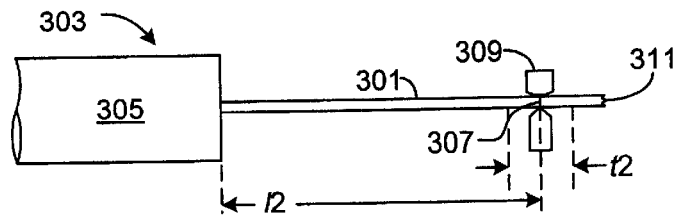
FIGS. 3A–3D are functional block diagrams illustrating an installation process for installing the optical connector of FIG. 2 onto an optical fiber of an optical cable.
Figure 3B:
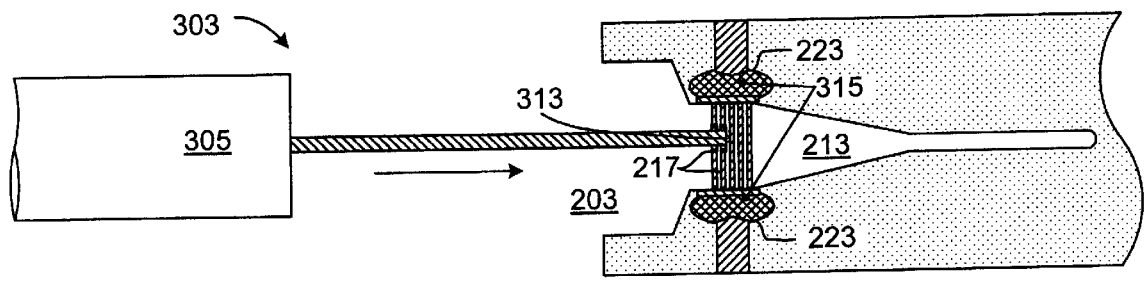

FIGS. 3A–3D are functional block diagrams illustrating an installation process for coupling the optical connector 200 to an optical fiber 301 of an optical cable 303. It is contemplated that the illustrated procedure be conducted by a gloved technician. As shown in FIG. 3A, the optical cable 303 includes an outer protective sheath 305 that is cut back or stripped to expose a sufficient length of the optical fiber 301. The initial tip 311 may be damaged or compromised and not suitable for optical communications. The optical fiber 301 is scored at a sufficient location 307 along its length using an appropriate cleave tool 309. Several cleave tools are known and are typically not overly specialized or expensive. The optical fiber 301 is then snapped at the scored location 307 to expose a fresh tip 313 (FIG. 3B). It is desired that the tip 313 have a generally planar surface that is normal to a centerline of the optical fiber 301 along its length. The remaining length "l2" of the optical fiber 301 between the sheath 305 and the tip 313 may be within a predetermined tolerance "t2" to facilitate successful connection to the optical connector 200.

Figure 3C:
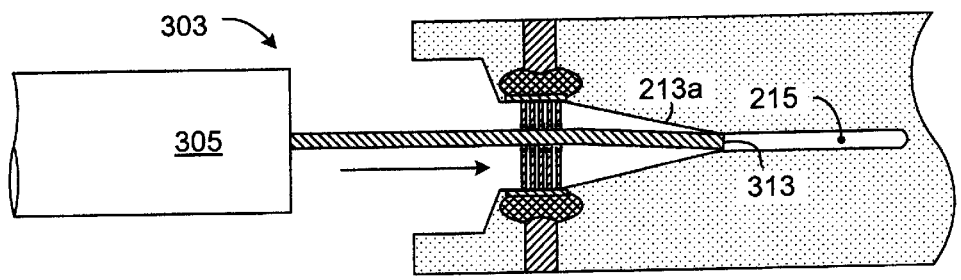
Figure 3D:
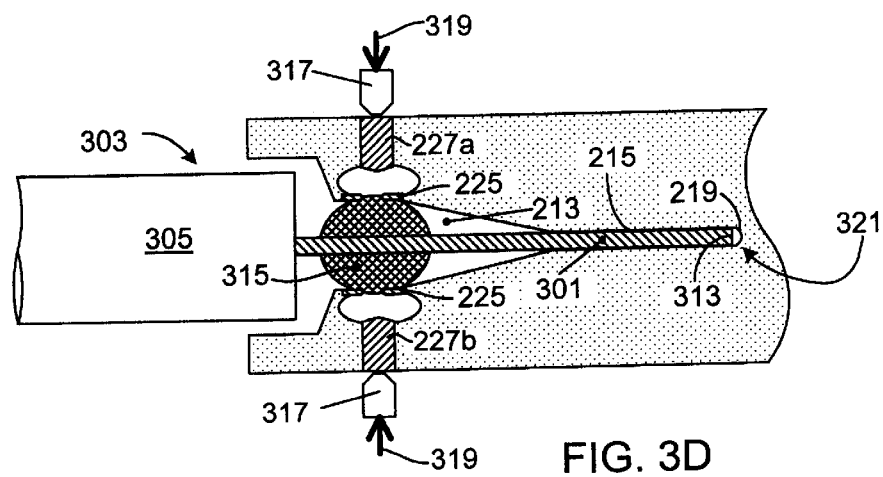

The tip 313 of the optical fiber 301 is inserted into the backend 203 of the optical connector 200, which is illustrated in cross-section in FIG. 3B. The epoxy chamber(s) 223 of the optical connector 200 are shown filled with a suitable epoxy polymers 315. As the optical fiber 301 is inserted into the fiber guide chamber 213, it ruptures the cleaning sheets 217, which serve to clean the tip 313 during insertion. As the optical fiber 301 is further inserted into the optical connector 200 as shown in FIG. 3C, the tip 313 interfaces the walls 213a of the fiber guide chamber 213, which guide the tip 313 towards the central fiber channel 215. The optical fiber 301 is fully inserted into the optical connector 200 until the tip 313 interfaces the surface 219 at the end of the central fiber channel 215 as shown in FIG. 3D. As appreciated by those skilled in the art of optical communications, the flat surface of the tip 313 of the optical fiber 301 and the curved surface 219 collectively form a plano-convex lens 321 that spreads light rays from the optical fiber 301 towards the surface 221, and that re-directs light rays from the surface 221 and converging towards the lens 321 onto the optical fiber 301. The technician uses a crimp tool 317 or the like to apply clamping pressure (illustrated by arrows 319) to the exposed sides of the epoxy release hammers 227a,b. The applied pressure causes the epoxy barrier(s) 225 to rupture releasing the epoxy polymers 315 into the fiber guide chamber 213. The epoxy 315 mixes and hardens thereby securing the optical fiber 301 of the optical cable 303 to the optical connector 200 completing the assembly. It is noted that the epoxy embodiments described herein provide a particularly convenient and adequate fiber fastening mechanism for securing an optical fiber to a connector. Other fiber fastening mechanisms or means may be employed.

Figure 4:
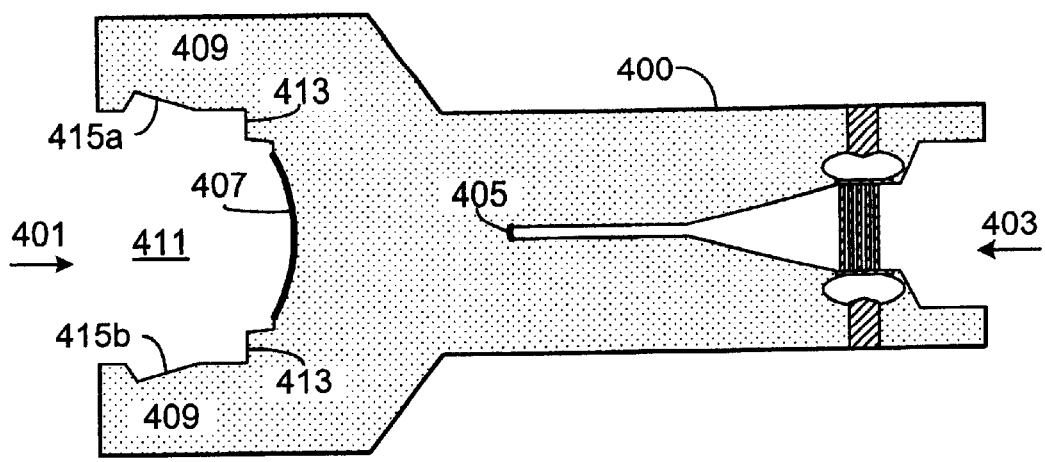
FIG. 4 is a cross-sectional side view of a female connector implemented according to an embodiment of the present invention.

FIG. 4 is a cross-sectional side view of a female connector 400 implemented according to an embodiment of the present invention. The female optical connector 400 is made and configured in substantially the same manner as the male optical connector 200. The female connector 200 includes a back end 403 that is configured substantially identical to the male optical connector 200, including similar chambers, channels, cavities, hammers, etc. to facilitate coupling to a suitable optical cable, and will not be further described herein. The female connector 400 includes an inner surface 405 and an outer surface 407 that are configured to form a lens that functions in substantially identical manner as the surfaces 219, 221 of the male connector 200. The female connector 400 includes a front end 401 that is configured in a different and complementary manner to facilitate coupling together the male and female connectors to enable bi-directional optical communications. In particular, the front end 401 includes an extended portion 409 that forms a connector insertion chamber 411 having a size and shape corresponding to the front end 205 of the male connector 200. The connector insertion chamber 411 includes a base or connector stop 413 configured to interface the front face 206 of the male connector 200 when the connectors 200, 400 are mated together. The connector insertion chamber 411 includes a suitable latching or locking mechanism 415 that is configured to interface the latching or locking mechanism 204 of the male connector 200 when the connectors 200, 400 are mated together. As shown, a pair of latching or locking mechanism 415a and 415b are provided in the connector insertion chamber 411 to interface the pair of latching or locking mechanism 204a and 204b, respectively, when the connectors 200, 400 are mated together.

Figure 5:
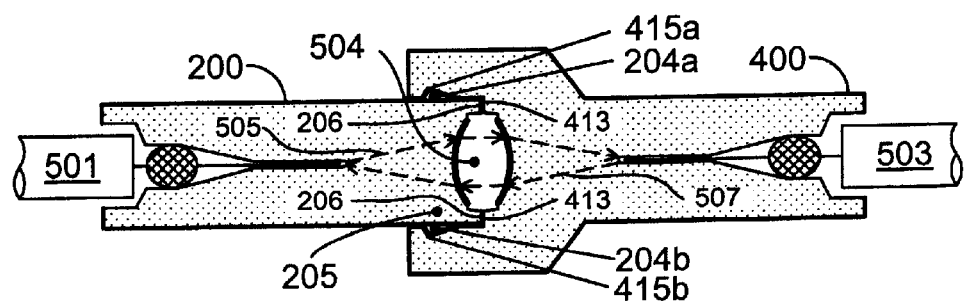
FIG. 5 is a partial cross-sectional enlarged side view illustrating the male optical connector of FIG. 2 mated to the female optical connector of FIG. 4.
Figures 6A, 6B:
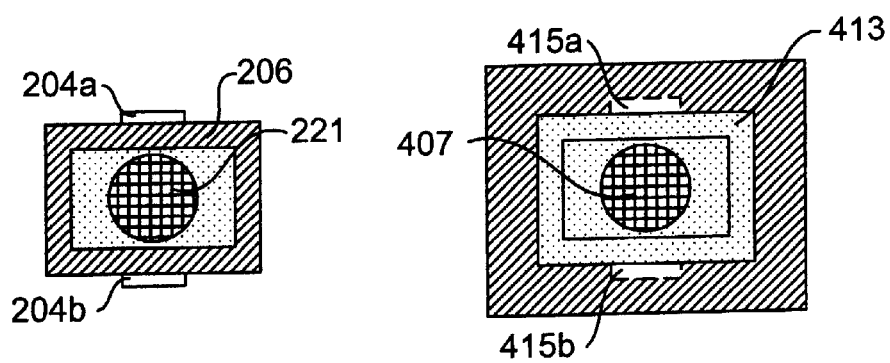
FIG. 6A is an enlarged front end view of the male optical connector of FIG. 2 looking into its front end.
FIG. 6B is an enlarged front end view of the female optical connector of FIG. 4 looking into its front end.

FIG. 5 is a partial cross-sectional enlarged side view illustrating the male optical connector 200 mated to the female optical connector 400. Also, the male connector 200 is coupled to an optical cable 501 and the female connector 400 is coupled to an optical cable 503. FIG. 6A is an enlarged front-end view of the male optical connector 200 looking into the front end 205 of the male connector 200. FIG. 6B is an enlarged front-end view of the female optical connector 400 looking into the front end 401 of the female connector 400. The front end 205 of the male connector 200 is inserted into the connector insertion chamber 411 at the front end of the female connector 400 until the front face 206 of the male connector 200 is interfaced to the connector stop 413 of the female connector 400. Also, the pair of latching or locking mechanism 415a and 415b are interfaced to the corresponding pair of latching or locking mechanism 206a and 206b, respectively, to latch or otherwise lock the male and female connectors 200, 400 together in the mated position as shown. In the mated position, the outer surfaces of the male and female connectors are positioned to directly face each other across an internal air chamber 504 as shown to facilitate optical communications. In particular, the concave surfaces are positioned directly opposite with respect to each other on either side of the air chamber 504, and the surfaces are both centered to have a common centerline with the centerlines of the respective connector lenses.

A series of dashed lines 505 illustrate that optical light rays from the optical cable 501 are communicated from the inner surface 219 to the outer surface 221 of the male connector 200, where the outer surface 221 of the male connector 200 redirects the light rays in a parallel direction towards the outer surface 407 of the female connector 400. The outer surface 407 of the female connector 400 directs the light rays to its inner surface 405 and to the optical cable 503. In a similar manner, another series of dashed lines 507 illustrate that optical light rays from the optical cable 503 are communicated to the optical cable 501 via the inner and outer surfaces of the connectors 200, 400 in a similar manner. Thus, bi-directional optical communications are enabled between the optical cables 501 and 503 using the connectors 200, 400.

Figure 7:
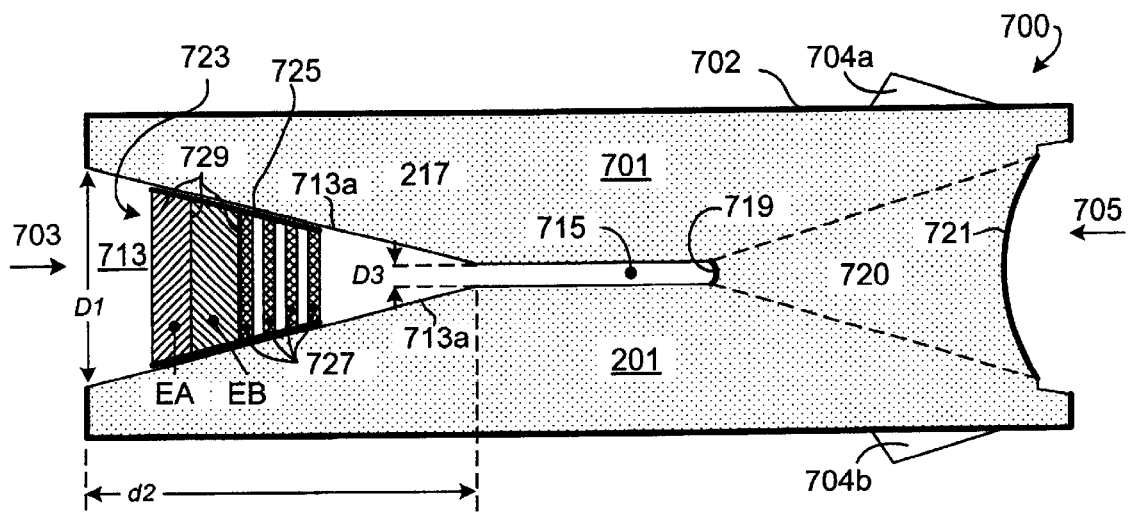
FIG. 7 is an enlarged cross-sectional side view of another exemplary male optical connector implemented according to an alternative embodiment of the present invention.

FIG. 7 is an enlarged cross-sectional side view of another exemplary male optical connector 700 implemented according to an alternative embodiment of the present invention. The male optical connector 700 is similar in configuration and function to the male optical connector 200 with a few modifications that facilitate ease of manufacture. The optical connector 700 includes a body 701 forming a backend 703 and a front end 705. The body 701 may be configured in a similar manner and made of similar materials as the body 201. The front end 705 of the optical connector 700 is substantially identical to the front end 205 of the optical connector 200 in form and function. The optical connector 700 includes a central fiber channel 715 and lens 720 which are substantially identical to the central fiber channel 215 and lens 220 of the optical connector 200. The lens 720 is formed in a substantially identical manner including substantially identical inner and outer surfaces 719, 721. The optical connector 700 may include latching or locking mechanism 704a and 704b similar to the latching or locking mechanisms 204a and 204b, and an outer protective sheath 702 is optionally provided around the outer extent of the body 701.

The backend 703 of the connector 700 includes a fiber guide chamber 713 similar to the fiber guide chamber 213, except that cable insert chamber 207 and fiber guide chamber 213 are replaced by a single elongated fiber guide chamber 713. The generally conical-shaped fiber guide chamber 713 is formed at or near the center of the backend 703 of the body 701 and extends within the length of the body 701 by the depth d2 to the beginning of the central fiber channel 715. The conical-shaped fiber guide chamber 713 has an initial diameter of D1 at the backend 703 and an ending diameter D3 forming the mouth of the central fiber channel 715, which forms a tapered outer wall 713a in the body 701. As described previously, the diameter D1 is slightly larger than the outer sheath of a fiber optic cable so that the outer sheathing may be inserted into the initial portion of the central fiber channel 715 during the installation process for coupling the optical connector 700 to an optical fiber of an optical cable. Also, the tapered outer wall 713a of the fiber guide chamber 713 is configured to interface and guide the end of the inserted optical fiber to the central fiber channel 715 while it is being inserted.

The cleaning sheets 217, epoxy chambers 223, epoxy barriers 225, and epoxy release hammers 227 are omitted in favor of an epoxy filter insert 723. In this manner, the fiber bonding system and fiber tip cleaner are incorporated within the epoxy filter insert 723. The epoxy filter insert 723 includes a conical-shaped outer casing 725, encasing a pair of epoxy chambers EA and EB and multiple cleaning sheets 727. The surface of the outer casing 725 is conical-shaped to fit against the tapered outer wall 713a of the fiber guide channel 713. The epoxy chambers EA and EB are isolated with thin plastic membranes 729 or the like that are mounted or otherwise fastened to the inner surface of the outer casing 725 towards the back, larger end of the epoxy filter insert 723. The epoxy chambers EA and EB are filled with epoxy polymers, such as complementary epoxy resin and hardener polymers that harden when mixed together as known to those skilled in the art. The cleaning sheets 727 are similar to the cleaning sheets 217 and mounted or otherwise fastened to the inner surface of the outer casing 725 towards the front, smaller end of the epoxy filter insert 723. The cleaning sheets 727 and membranes 729 are made of variable diameter to snugly fit within corresponding depths of the conical-shaped outer casing 725 as shown.

The epoxy filter insert 723 may be fabricated or manufactured in a separate process. For example, the cleaning sheets 217 are inserted first followed by a first membrane 729 forming one end of the inner epoxy chamber EB. A suitable amount of a first epoxy polymer is injected and the middle membrane 729 is installed. A suitable amount of a complementary epoxy polymer is injected and the outer membrane 729 is installed to complete the fabrication process of the epoxy filter insert 723. The epoxy filter insert 723 is then inserted into the fiber guide chamber 713 and glued, cemented or otherwise mounted to the wall 713a of the fiber guide channel 713. In this manner, the epoxy filter insert 723 plugs the fiber guide chamber 713 to protect the central fiber channel 715 and surface 719 from contamination prior to use.

A similar female connector (not shown) may be implemented in substantially the same manner as the connector 700 and having a front end that is substantially identical with the front end 401 of the female optical connector 400. In this manner, the optical connectors are interchangeable in that the connector 700 mates with the connector 400 in the same manner and the connector 200 mates with the female counterpart of the connector 700 in the same manner to complete corresponding optical connections.

It is appreciated that the optical connector 700 has a design that facilitates a simpler and potentially less-expensive manufacture process than the connectors 200 or 400. The fiber guide chamber 713 is simpler and may be molded or drilled in a single operation. The epoxy chambers 223, epoxy barriers 225, and epoxy release hammers 227 are not necessary significantly simplifying fabrication of the body 701. Instead, the epoxy filter insert 723 is fabricated in a separate process and inserted and glued in the fiber guide chamber 713 to complete the manufacture process. Also, as described further below, the optical connector 700 enables a simplified installation process when coupling to an optical cable. When an optical fiber is inserted, there is no need for crimping since the optical fiber is used to breach the epoxy chambers and release the epoxy.

Figure 8A:
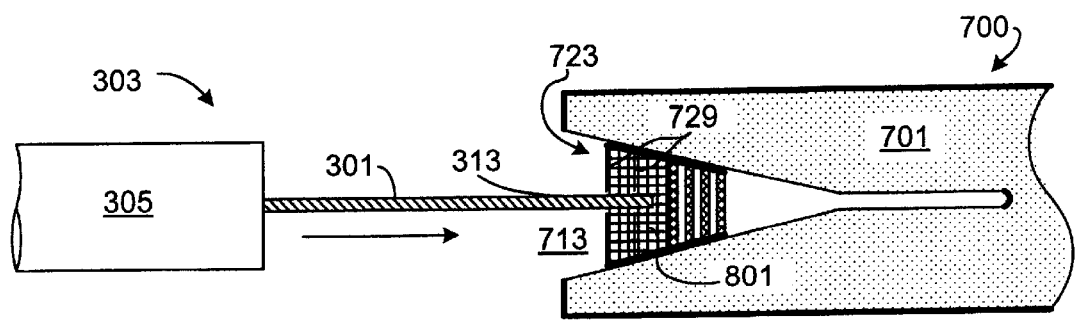
FIGS. 8A and 8B are functional block diagrams illustrating an installation process for coupling the optical connector of FIG. 7 to an optical fiber of an optical cable similar to the installation process illustrated in FIGS. 3A–3D.
Figure 8B:
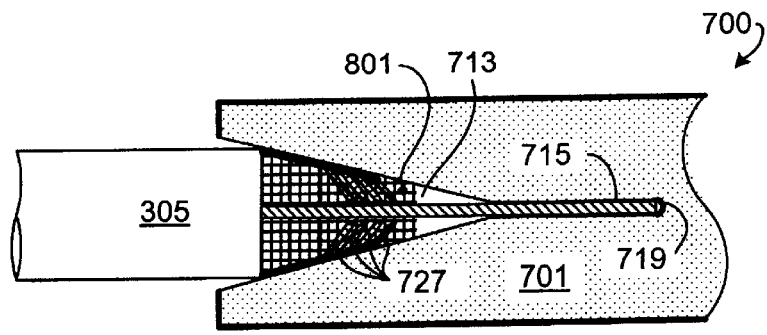

FIGS. 8A and 8B are functional block diagrams illustrating an installation process for coupling the optical connector 700 to an optical fiber 301 of an optical cable 303 similar to the installation process illustrated in FIGS. 3A–3D. As illustrated in FIG. 8A, as the tip 313 of the optical fiber 301 is inserted into the fiber guide chamber 713 and into the epoxy filter insert 723, it breaches the membranes 729 causing the epoxy polymers in the epoxy chambers EA, EB to mix forming an epoxy mixture 801. As illustrated in FIG. 8B, the tip 313 ruptures the cleaning sheets 727 cleaning the tip 313 as it is inserted. Although the tip 313 is initially exposed to the epoxy polymers, the cleaning sheets 727 sufficiently clean the tip 313 as it is inserted. As described previously, the tip 313 is inserted all the way into the central fiber channel 715 so that the tip 313 interfaces the inner surface 719 of the lens 720. The epoxy mixture 801 eventually fills a portion of the fiber guide chamber 713 and hardens thereby cementing the optical cable 303 and the optical fiber 301 to the connector 700.

Figure 9:
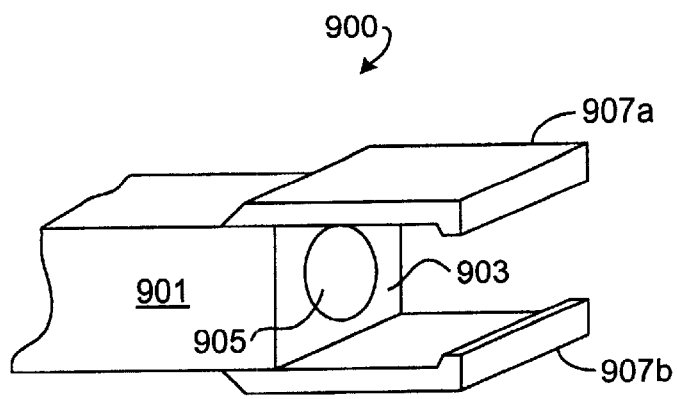
FIG. 9 is a simplified perspective diagram an exemplary "uniform" or "unisex" connector.
Figure 10:
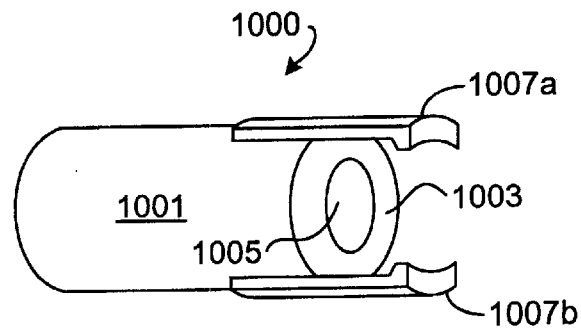
FIG. 10 is a simplified perspective diagram another exemplary uniform or unisex connector having a cylindrical shape.

It is appreciated that the form and shape of the connectors discussed herein are exemplary only and that many different connector configurations are possible. FIG. 9, for example, is a simplified perspective diagram an exemplary "uniform" or "unisex" connector 900. The connector 900 includes a box-shaped body 901 that is configured in substantially the same manner as the connectors 200 or 700 previously described. The connector 900 includes a generally square front face 903 and outer lens surface 905. The connector 900 further includes a pair of latching or locking mechanisms 907a,b that are positioned on opposite sides of the connector body 901. In this manner, the connector 900 mates with an identical connector 900 facing the opposite direction and rotated by 90 degrees. The latching or locking mechanisms 907a,b overlap the connector body 901 of the other connector to mate the connectors together. FIG. 10 is a simplified perspective diagram another exemplary "uniform" or "unisex" connector 1000 having a cylindrical shape. The connector 1000 includes a cylindrical-shaped body 1001 that is configured in substantially the same manner as the connectors 200 or 700 previously described. The connector 1000 includes a generally circular front face 1003 and outer lens surface 1005. The connector 1000 further includes a pair of latching or locking mechanisms 1007a,b that are positioned on opposite sides of the connector body 1001. In this manner, the connector 1000 mates with an identical connector 1000 facing the opposite direction and rotated a sufficient amount to enable latching or locking, such as by 90 degrees. The latching or locking mechanisms 1007a,b overlap the connector body 1001 of the other connector to mate the connectors together. Of course, other configurations are possible including those without latching or locking mechanisms, where a separate latching or locking mechanism (not shown) may be employed. It is appreciated that the unisex configurations shown further simplify the manufacturing process in that only a single connector type need be manufactured rather than complementary types.

Figure 11A:
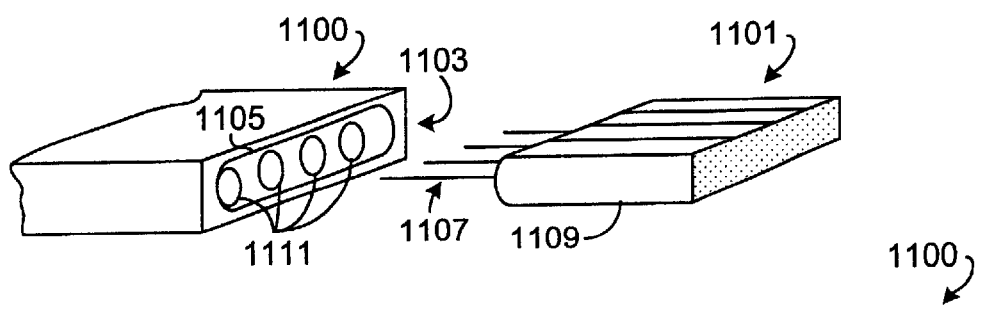
FIG. 11A is a simplified perspective diagram of the back end of an exemplary multiple fiber connector for interfacing multiple optical fibers, such as a ribbon cable.

FIG. 11A is a simplified perspective diagram of the back end 1103 of an exemplary multiple fiber connector 1100 for interfacing multiple optical fibers, such as a ribbon cable 1101. The connector 1100 illustrates that any of the connector configurations previously described may be integrated within a single connector body with multiple connectors. The connector 1100 illustrated is a 4-fiber connector, although it is understood that any number of individual connectors may be combined into a single connector body, such as 2, 4, 6, 8, 12, 16, etc. In the illustrated configuration, the ribbon cable 1101 includes 4 fibers 1107 positioned side-by-side resulting in a flat cable. It is appreciated, however, that any type of multiples fiber cable or even multiple cables may be used rather than the ribbon cable. The outer sheathing 1109 of the cable 1101 has been cut back or stripped to expose a sufficient length of each of the optical fibers, and the individual fibers are then cut to provide fresh optical tips to ensure reliable optical communications in as similar manner as described above with reference to FIG. 3A. The backend 1103 includes an oval-shaped opening 1105 for receiving the multiple fibers 1107 of the ribbon cable 1101. The opening 1105 leads to individual circular openings 1111, each for receiving a corresponding one of the 4 fibers 1107. Each of the openings 1111 lead to internal fiber guide chambers (not shown) and fiber channels (not shown) for interfacing the individual fibers 1107. The internal configuration of the multiple fiber connector 1100 is configured in substantially the same manner as any of the connectors previously described, except that the connector 1100 includes multiple individual connector configurations integrated into a single multiple connector body. Each connector configuration includes a fiber tip cleaner and fiber bonding system.

Figure 11B:
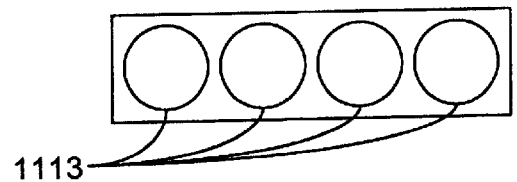
FIG. 11B is a simplified front view of the multiple fiber connector of FIG. 11A.

FIG. 11B is a simplified front view of the multiple fiber connector 1100 of FIG. 11A. The front of the connector 1100 is configured in substantially the same manner as any of the connectors previously described, except including multiple external concave surfaces 1113 corresponding to the four internal lenses (not shown) within.

Figure 12:
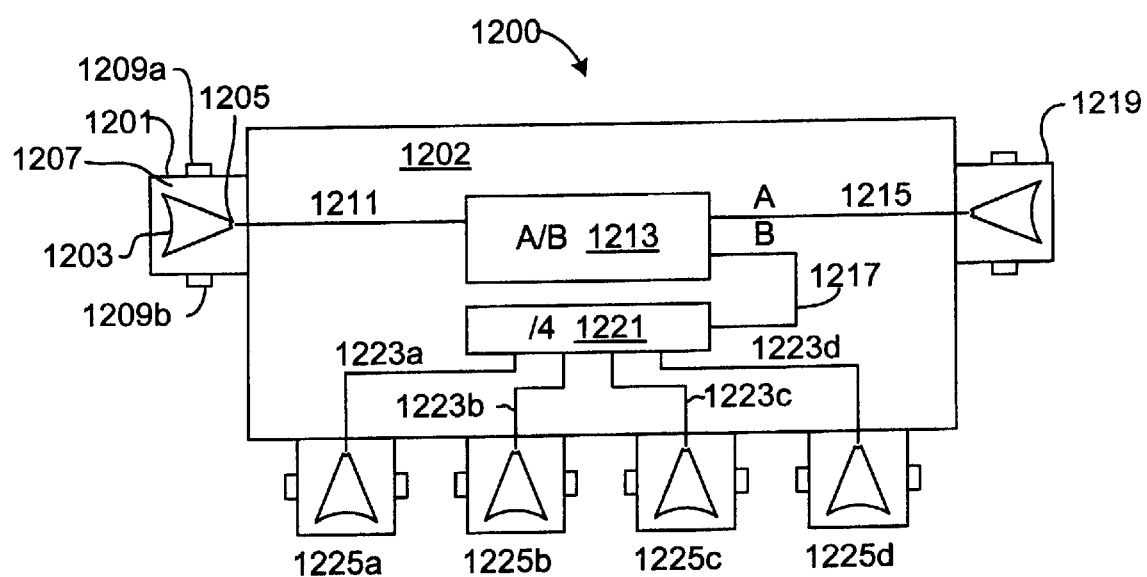
FIG. 12 is a functional block diagram of an exemplary optical tap configuration implemented according to an embodiment of the present invention that may include splitter functions, combiner functions or a combination of both.

FIG. 12 is a functional block diagram of an exemplary optical tap 1200 implemented according to an embodiment of the present invention that may include splitter functions, combiner functions or a combination of both. The tap 1200 may be used for any of the taps 111i of the communication network 100 previously described. In the embodiment shown, the optical tap 1200 includes an optical connector 1201 mounted on one side of a tap body 1202, where the connector 1201 is generically shown and is configured in a similar manner as the front end of the optical connectors 200, 700, 900 or 1000 previously described. In particular, the optical connector 1201 includes an outer surface 1203 and an inner surface 1205 forming a lens that is configured and positioned to operate in substantially the same manner as the lens 220 formed by the surfaces 219, 221 of the optical connector 200 or the lens 720 formed by the surfaces 719, 721 of the optical connector 700. The outer surface 1203 is exposed for inspection and cleaning by a technician. The connector 1201 may be implemented as male, female or unisex. For example, the optical connector 1201 includes a body 1207 that may have a size and shape similar to the front end 205 of the optical connector 200, so that the connector 1201 operates to mate with the female optical connector 400 to establish an optical communication connection. In this case, the optical connector 1201 further includes a pair of latching or locking mechanisms 1209a, 1209b that are configured substantially identical with the mechanisms 204a, 204b to interface the mechanisms 415a, 415b of the female optical connector 400 to latch or lock the connectors together.

The male optical connector 1201 does not need to include the optical fiber apparatus provided at the rear ends of the connectors 200 or 700 or the like. Instead, the optical connector 1201 is communicatively coupled with an optical fiber 1211 that is routed from the inner surface 1205 of the connector 1201 to a directional coupler 1213 provided within the tap body 1202 of the tap 1200. The directional coupler 1213 operates to split the power level of an optical signal from the optical fiber 1211 into two separate optical signals that are asserted on corresponding internal optical fibers 1215 and 1217. The specified signal split is according to a split percentage A/B, where A% of the signal is asserted onto the optical fiber 1215 and B% is asserted onto the optical connector 1217. Typical split percentages include 90/10, 80/20, 75/25, 50/50, etc. For example, if the directional coupler 1213 is configured with a 90/10 split, then approximately 90% of the optical signal from the optical fiber 1211 is asserted onto the optical fiber 1215 and approximately 10% of the optical signal is asserted onto the optical fiber 1217 (ignoring signal losses). Another male optical connector 1219 is mounted on another side of the tap body 1202 and communicatively coupled to the fiber 1215, which is routed between the directional coupler 1213 and an inner surface of the connector 1219. The optical connector 1219 is configured in a substantially identical manner as the connector 1201 and is not further described. In this manner, 90% of an optical signal delivered by an optical cable mounted to a female connector mated with the connector 1201 is delivered to another optical cable mounted to another female connector mated to the connector 1219. It is appreciated, however, that losses occur through the male and female connectors and through the directional coupler 1213, as further described below, which are considered when designing a power budget.

The optical fiber 1217 is routed to an internal 4-way ("/4") splitter 1221, which splits the optical signal delivered by the optical fiber 1217 into 4 separate optical signals. The initial signal may be equally split 4 ways (e.g., in terms of percentage, 25, 25, 25, 25), or may be split according any other specified percentages as desired. In the embodiment shown, the signal is equally split 4 ways and the 4 separate signals are then asserted on internal optical fibers 1223a, 1223b, 1223c and 1223d, respectively. The optical fibers 1223a–d are routed from the splitter 1221 to four male optical connectors 1225a, 1225b, 1225c and 1225d, respectively. Each of the male optical connectors 1225a–d are configured in a substantially identical manner as the optical connector 1201 and are not further described. In this manner, the optical signal from the optical fiber 1217 is split 4 ways into four separate optical signals delivered to the connectors 1225a –d. With reference to the communication network 100, the tap 1200 may be used as any one of the taps 111 in which an optical signal delivered by a segment 108i is divided into a first optical signal that is delivered to the next segment 108i and a residual signal that is split 4 ways and delivered to subscriber links 110a–d.

It is appreciated that the optical tap 1202 may be implemented in many different alternative manners. The differential combiner 1213 may be configured with any selectable split percentage. The splitter 1221 may be implemented as a 2-way, 3-way, 4-way, 8-way, etc. splitter, where the split function may be equal or varied depending upon the desired function. The connectors 1201, 1219, 1225a–d may be male or female connectors or implemented according to any suitable alternative connector configuration. The optical tap 1202 may be implemented as an optical combiner instead. In this case, the connectors 1225a–d and 1219 operate as input connectors and the connector 1201 operates as an output connector. The splitter 1221 is configured as an optical combiner. The configuration is nearly identical, except that the splitter 1221 is configured as an optical combiner for combining optical signals received from the connectors 1225a–d into a combined signal B asserted on optical fiber 1217. An optical signal received via connector 1219 and asserted on optical fiber 1215 as signal A is combined with the signal B by the directional coupler 1215, and the combined optical signal is asserted on optical fiber 1211 and provided as an output optical signal accessible via connector 1201. It is further noted that the optical tap 1202 may be configured to perform both splitter and combiner functions to enable full duplex optical communications via single optical fibers and cables.

The optical tap 1200 may be used to implement that "last mile" of the communication network 100 to implement FTTH. At each location in which a tap 111i is placed for downstream communications, a corresponding combiner is used for upstream communications on a separate fiber run. In this case, each subscriber link 110 and each segment 108i includes at least two fibers for full-duplex communications. The splitter/combiner functions may be incorporated into a single tap/combiner unit if desired. In an alternative embodiment using single optical fibers employing full duplex optical communication protocols, the combined functions are incorporated into connectors of a single combined unit. The combined unit includes circulator optical devices (not shown) to separate the splitter/combiner functions within the unit as known to those skilled in the art.

Figure 13:
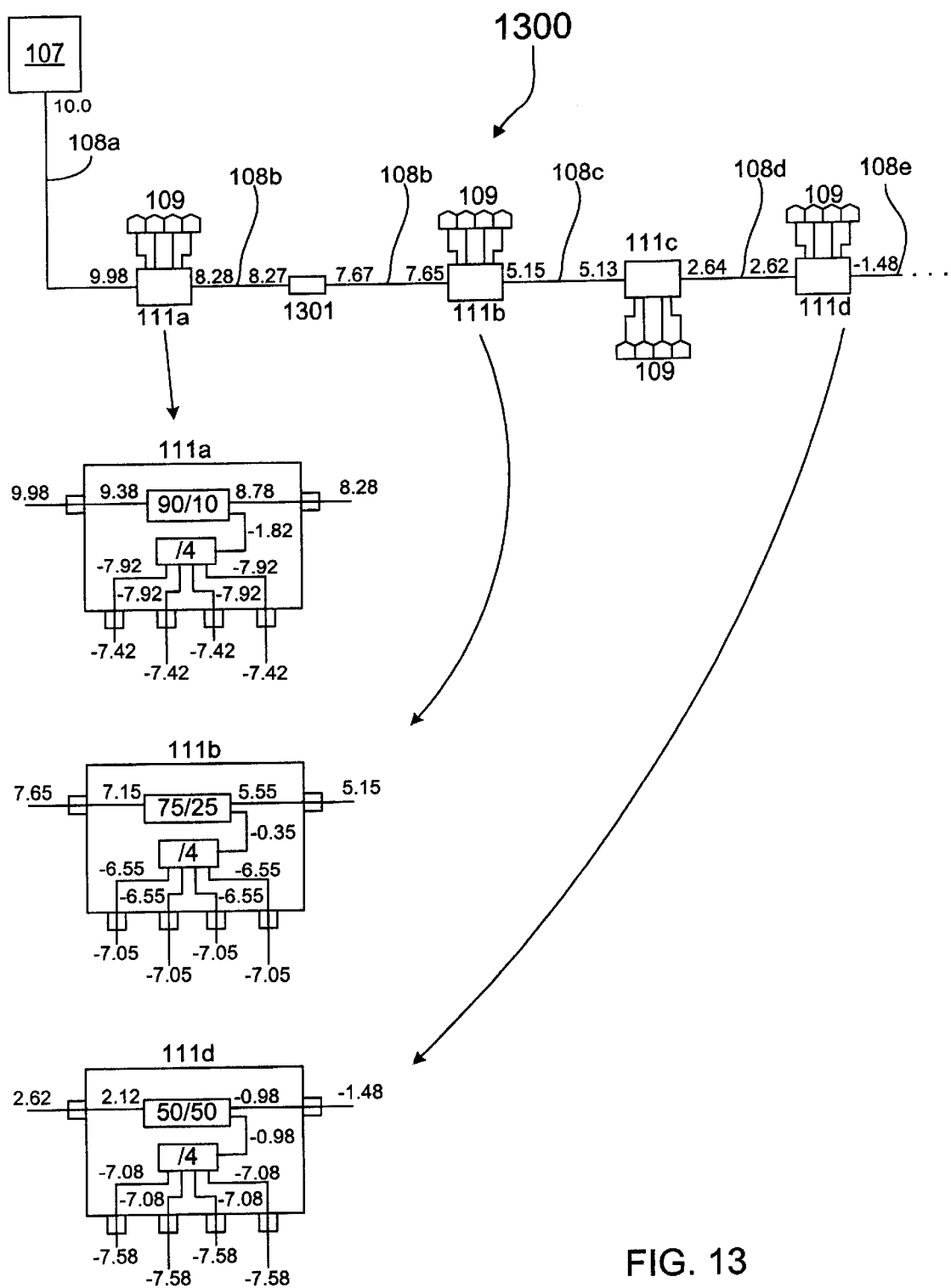
FIG. 13 is a block diagram of a "last mile" network leg showing use of the tap of FIG. 12 as the taps of FIG. 1 for a final downstream leg of the communication network of FIG. 1 illustrating an exemplary power budget.

FIG. 13 is a block diagram of a "last mile" network leg 1300 of the FTTH configuration showing use of the optical tap 1200 as the taps 111i for a final downstream leg of the communication network 100 illustrating an exemplary power budget. It is desired to provide between –5 and –10 dBm to each subscriber location 109, although a signal as low as –20 dBm may be considered acceptable depending upon the capabilities of fiber communication equipment employed. A node 107 asserts an optical signal of 10 dBm (decibels relative to one milliwatt) intended for a plurality of subscriber locations 109. Numbers adjacent the signal path denote the measured signal strength in dBm at that point. The signal is asserted on a first segment 108a having a length of approximately 200 feet. Assuming a signal loss of 0.01 dBm per 100 feet, the signal strength at a first tap 111a is 9.98 dBm after a 0.02 dBm loss. The tap 111a includes a 90/10 directional coupler and a 4-way splitter. As shown, the tap 111a incurs a loss of 0.6 dBm at its input connector resulting in a signal of 9.38 dBm applied at the input of the 90/10 directional coupler. A typical 90/10 directional coupler incurs loss so that 8.78 dBm is passed to the output connector and –1.82 dBm is provided to the 4-way splitter. The output connector incurs a loss of 0.5 dBm leaving 8.28 dBm asserted on the next segment 108b. The 4-way splitter asserts four –7.92 dBm signals to the four corresponding output connectors. Assuming that the output connectors each incur about 0.5 dBm loss, each of the corresponding four subscriber location 109 receives a signal measuring approximately –7.42 dBm in the example shown.

The segment 108b is approximately 300 feet and has been repaired using a male/female connector combination 1301. The connector 1301 is located approximately 100 feet after the tap 111a and incurs a loss of 0.6 dBm. Thus, the connector 1301 receives 8.27 dBm at its input and asserts 7.67 dBm at its output. After another 200 feet, an optical signal measuring 7.65 dBm is provided to the input of a second tap 111b. The tap 111b includes a 75/25 directional coupler and a 4-way splitter. As shown, the input connector incurs a loss of 0.5 dBm leaving 7.15 dBm at the input of the 75/25 directional coupler. The directional coupler provides 5.55 dBm of signal at one output, which is provided to an output connector that incurs a loss of 0.5 dBm. The output connector asserts a signal measuring 5.15 dBm onto the next segment 108c. An optical signal measuring –0.35 is provided to the 4-way splitter, which asserts four signals measuring –6.55 dBm. Assuming a loss of 0.5 dBm per connector, the next group of four subscriber locations 109 receive signals measuring approximately –7.05 dBm. The network leg 1300 continues in this manner. Another downstream optical tap 111*d* is shown in detail, which provides four signals measuring −7.58 dBm each to a corresponding four subscriber locations 109. A signal measuring −1.48 dBm is left at the output of the tap 111*d* for a next segment 108*e* if desired. Repeating in this manner, several more subscriber locations 109 may be supported, where each receives a sufficient signal strength within specified parameters. Also, the power budget is sufficient to incur additional losses due to repair, such as resulting in additional connector combinations 1301.

Although a system and method according to the present invention has been described in connection with one or more embodiments, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A fiber optic connector, comprising:

a body forming a fiber insertion path including a fiber channel extending within the body to an internal end, the fiber channel configured to receive an optical fiber;

an optical lens including a first concave surface formed at the internal end of the fiber channel and a second concave surface formed on an external side of the body, the lens having a centerline extending between the center points of the first and second concave surfaces;

the first concave surface of the lens operative to spread light sourced from an optical fiber inserted into the fiber channel towards the second concave surface and to re-direct light converging from the second concave surface towards the first concave surface onto the optical fiber; and the second concave surface having a suitable size for visual inspection and cleaning and configured to re-direct light diverging from the first concave surface to a direction generally parallel with the centerline and to re-direct light directed towards the second concave surface and in parallel with the centerline towards the first concave surface.

2. The fiber optic connector of claim 1, wherein the body integrates a plurality of connectors and forms a plurality of individual fiber insertion paths and corresponding optical lenses.

3. The fiber optic connector of claim 1, wherein the body comprises a material that is optically transparent in an applicable wavelength range suitable for optical communications.

4. The fiber optic connector of claim 1, wherein the fiber insertion path includes a fiber guide chamber located between a fiber insert opening on an external side of the body and an opening of the fiber channel opposite the internal end, the fiber insert opening having a visible size suitable to facilitate threading an optical fiber and the fiber guide chamber configured to guide an inserted optical fiber into the fiber channel.

5. The fiber optic connector of claim 4, wherein the fiber guide chamber is formed within the body with tapered walls between the fiber insert opening and the fiber guide channel opening.

6. The fiber optic connector of claim 4, wherein the fiber insert opening has a size sufficient to encompass a fiber cable sheath.

7. The fiber optic connector of claim 1, further comprising:

a fiber tip cleaner located within the fiber insertion path that cleans a tip of an optical fiber while the optical fiber is inserted.

8. The fiber optic connector of claim 7, wherein the fiber tip cleaner comprises at least one sheet of a low residue paper.

9. The fiber optic connector of claim 7, further comprising:

a fiber bonding system located along the fiber insertion path that is operative to hold the optical fiber to the body after insertion.

10. The fiber optic connector of claim 9, wherein the fiber bonding system comprises epoxy.

11. The fiber optic connector of claim 10, wherein the fiber bonding system comprises:

first and second epoxy chambers provided within the body adjacent the fiber insertion path and filled with epoxy resin and hardener polymers, respectively;

first and second epoxy barriers positioned between the first and second epoxy chambers, respectively, and the fiber guide chamber operative to temporarily contain the epoxy polymers within the first and second epoxy chambers; and first and second epoxy hammers provided in the body between outer opposing surfaces of the body and the first and second epoxy chambers, respectively, the epoxy hammers configured to force the epoxy polymers to breach the epoxy barriers to release the epoxy polymers into the fiber insertion path in response to compression applied to the first and second epoxy hammers.

12. The fiber optic connector of claim 9, further comprising:

an epoxy filter insert incorporating the fiber tip cleaner and the fiber bonding system, the epoxy filter insert configured to mount within the fiber insertion path.

13. The fiber optic connector of claim 12, wherein the epoxy filter insert comprises:

a casing having an outer surface between a front end and a back end, the outer surface of the casing configured to mount to inner walls of the body with the back end towards an opening of the fiber insertion path;

a pair of epoxy chambers provided within and at the front end of the casing, the epoxy chambers separated by membranes and filled with epoxy polymers;

at least one sheet of a low residue paper provided within and at the backend of the casing; and the epoxy filter insert positioned to block the fiber insertion path when mounted therein so that when an optical fiber is inserted, a tip of the optical fiber breaches the epoxy chambers allowing mixture of the epoxy polymers within fiber insertion path and the tip then breaches the at least one sheet of low residue paper to clean the tip while the optical fiber is inserted.

14. The fiber optic connector of claim 1, further comprising:

the fiber insertion path including a fiber guide chamber located between a fiber insert opening on an external side of the body and an opening of the fiber channel opposite the internal end, the fiber insert opening having a visible size suitable to facilitate threading an optical fiber and the fiber guide chamber formed within the body with tapered walls between the fiber insert opening and the fiber guide channel opening to guide an inserted optical fiber into the fiber channel; and the casing having an outer surface that is conically-shaped to interface the tapered walls for mounting within the fiber guide channel.

15. The fiber optic connector of claim 1, wherein the body is configured to mate with a complementary fiber optic connector also having a similar optical lens with first and second concave surfaces, the complementary pair of fiber optic connectors each configured to form a mated configuration in which the second concave surfaces of the respective connectors are positioned to face each other in a concentric formation having a common centerline to enable bi-directional optic communications between optical fibers inserted in the complementary pair of fiber optic connectors.

16. A complementary pair of fiber optic connectors, each comprising:
  a body including a fiber channel extending within the body to an internal end, the fiber channel configured to receive an optical fiber;
  an optical lens including a first concave surface formed at the internal end of the fiber channel and a second concave surface formed on a front end of the body, the lens having a centerline extending between the center points of the first and second concave surfaces;
  the first concave surface of the lens operative to spread light sourced from an optical fiber positioned within the fiber channel towards the second concave surface and to re-direct light sourced from the second concave surface towards the first concave surface onto the optical fiber; and
  the second concave surface having a suitable size for visual inspection and cleaning and configured to re-direct light sourced from the first concave surface to a direction generally parallel with the centerline and to re-direct light directed towards the second concave surface and in parallel with the centerline towards the first concave surface; and
  wherein the front end of the body of each connector is configured to mate with a complementary connector to form a mated configuration in which the second concave surfaces of the connectors are optically coupled to face each other in a concentric formation having a common centerline.

17. The complementary pair of fiber optic connectors of claim 16, comprising a pair of complementary male and female connectors, and wherein the front end of the female connector includes an extended portion that forms a connector insertion chamber having a size and shape corresponding to a front end of the male connector to facilitate the mated configuration.

18. The complementary pair of fiber optic connectors of claim 16, comprising a pair of complementary unisex connectors.

19. The complementary pair of fiber optic connectors of claim 16, wherein each body of each connector includes a plurality of fiber channels and optical lenses each including a second concave surface, and wherein corresponding second concave surfaces of corresponding optical lens of each of the connectors are optically coupled to face each other in a concentric formation having a common centerline in the mated configuration.

20. An optical block, comprising:
  a body;
  at least one optical functional unit provided within the body;
  a plurality of optical connectors mounted along an external surface of the body;
  a plurality of optical fibers, each routed between an internal optical functional unit and a corresponding one of the optical connectors; and
  each connector comprising a lens, the lens comprising:
    a first concave surface formed within the connector and a second concave surface formed on an external end of the connector, the lens having a centerline extending between the center points of the first and second concave surfaces;
    the first concave surface of the lens optically coupled to a corresponding one of the plurality of optical fibers and operative to spread light sourced from the optical fiber towards the second concave surface and to re-direct light sourced from the second concave surface towards the first concave surface onto the optical fiber; and
    the second concave surface having a suitable size for visual inspection and cleaning and configured to re-direct light sourced from the first concave surface to a direction generally parallel with the centerline and to re-direct light directed towards the second concave surface and in parallel with the centerline towards the first concave surface.

21. The optical block of claim 20, comprising:
  the at least one optical functional unit comprising a directional coupler and an n-way splitter, the directional coupler including an input and first and second outputs, the n-way splitter including an input and n outputs;
  an internal optical fiber connected between the second output of the directional coupler and the input of the n-way splitter;
  the plurality of optical connectors including an input connector, a tap output connector, and n splitter output connectors; and
  the plurality of optical fibers including an input fiber optically coupled between the tap input connector and the input of the directional coupler, a tap output fiber optically coupled between the first output of the directional coupler and the tap output connector, and n splitter output fibers each coupled between an output of the splitter and a splitter output connector.

22. The optical block of claim 20, comprising:
  the at least one optical functional unit comprising an n-way combiner and a directional coupler, the combiner including n inputs and an output, the directional coupler including first and second inputs and an output;
  an internal optical fiber coupled between the output of the combiner and the second input of the directional coupler;
  the plurality of optical connectors including an input connector, an output connector, and n combiner input connectors; and
  the plurality of optical fibers including an output fiber optically coupled between the output connector and the output of the directional coupler, an input fiber optically coupled between the input connector and the first input of the directional coupler, and n combiner input fibers each optically coupled between an input of the combiner and a corresponding combiner input connector.

23. A segmented FTTH optical network that enables optical communication between a local optical communication node and a plurality of subscriber locations, comprising:
  at least one segmented optical fiber optically coupled to the optical communication node and routed near each of the plurality of subscriber locations;

a plurality of optical taps distributed along the optical fiber and dividing the optical fiber into a plurality of segments, each tap including an input connector coupled to one optical fiber segment and an output connector coupled to an adjacent optical fiber segment, and each tap including at least one splitter output connector; and a plurality of subscriber optical fiber links, each coupled between a corresponding one of the plurality of subscriber locations and a corresponding splitter output connector of the plurality of optical taps.

24. The segmented FTTH optical network of claim 23, further comprising:

a plurality of optical combiners distributed along the optical fiber, each combiner including a segment input connector coupled to an optical fiber segment, a segment output connector coupled to an adjacent optical fiber segment, and at least one subscriber input coupled to a corresponding one of the subscriber optical fiber links.

25. The segmented FTTH optical network of claim 24, wherein the segmented optical fiber, the plurality of optical taps, the plurality of subscriber optical fiber links and the plurality of optical combiners support bi-directional optical communications.

26. The segmented FTTH optical network of claim 23, further comprising:

the at least one segmented optical fiber comprising a downstream segmented optical fiber and an upstream segmented optical fiber;

the plurality of subscriber optical fiber links each including a downstream subscriber link and an upstream subscriber link;

the plurality of optical taps distributed along the downstream segmented optical fiber; and a plurality of optical combiners distributed along the upstream segmented optical fiber, each combiner including a segment input connector coupled to one optical fiber upstream segment, a segment output connector coupled to an adjacent optical fiber upstream segment, and at least one subscriber input coupled to a corresponding one of the upstream subscriber links.

27. An optical network that enables optical communication for a plurality of subscriber locations, comprising:

an optical communication node;

a first segmented optical fiber optically coupled to the optical communication node and routed near each of the plurality of subscriber locations;

a plurality of optical taps distributed along the first segmented optical fiber for dividing it a plurality of segments, each optical tap including at least one splitter connector; and a plurality of first subscriber optical fiber links, each coupled to a corresponding splitter connector and routed to a corresponding one of the plurality of subscriber locations.

28. The optical network of claim 27, wherein each of the plurality of optical taps comprises a splitter and combiner combination for supporting full duplex optical communication between the plurality of first subscriber optical fiber links and the optical communication node.

29. The optical network of claim 27, wherein at least one of the plurality of optical taps comprises a directional coupler that splits a power level of an upstream segment into a first power level for a downstream segment and a second power level for a corresponding splitter connector.

30. The optical network of claim 29, wherein the at least one of the plurality of optical taps comprises a splitter coupled to the directional coupler that divides the second power level among a plurality of splitter connectors.

31. The optical network of claim 27, further comprising:

a second segmented optical fiber optically coupled to the optical communication node and routed near each of the plurality of subscriber locations;

a plurality of optical combiners distributed along the second segmented optical fiber for dividing it into a plurality of segments, each optical combiner including at least one combiner connector; and a plurality of second subscriber optical fiber links, each coupled to a corresponding combiner connector and routed to a corresponding one of the plurality of subscriber locations.

* * * * *